March 28, 1939.  E. E. HEWITT  2,152,256
INERTIA DEVICE
Filed Jan. 6, 1937   4 Sheets-Sheet 1
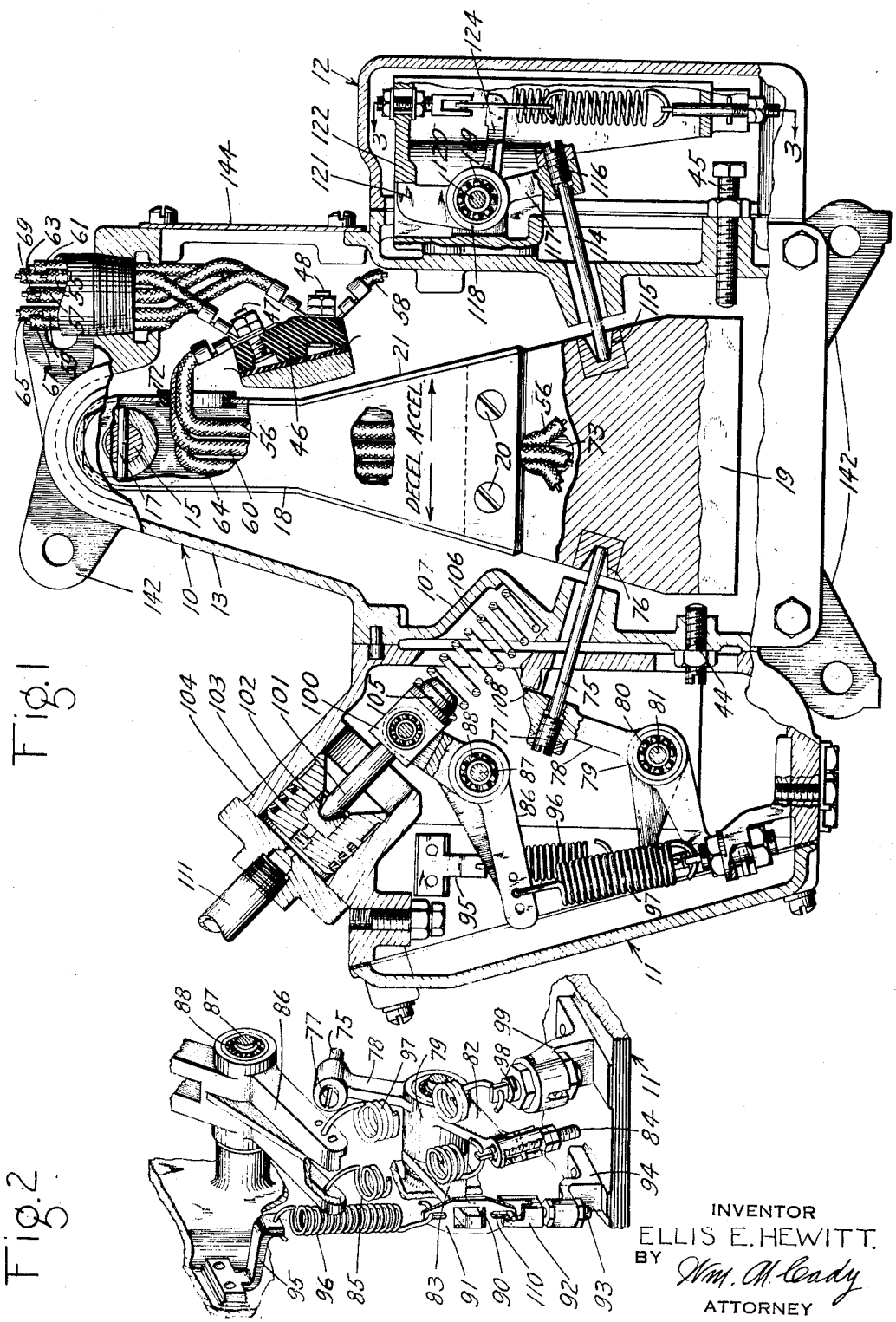
INVENTOR
ELLIS E. HEWITT.
BY Wm. M. Cady
ATTORNEY March 28, 1939.  E. E. HEWITT  2,152,256
INERTIA DEVICE
Filed Jan. 6, 1937  4 Sheets-Sheet 2

INVENTOR
ELLIS E. HEWITT.
BY Wm. M. Cady
ATTORNEY

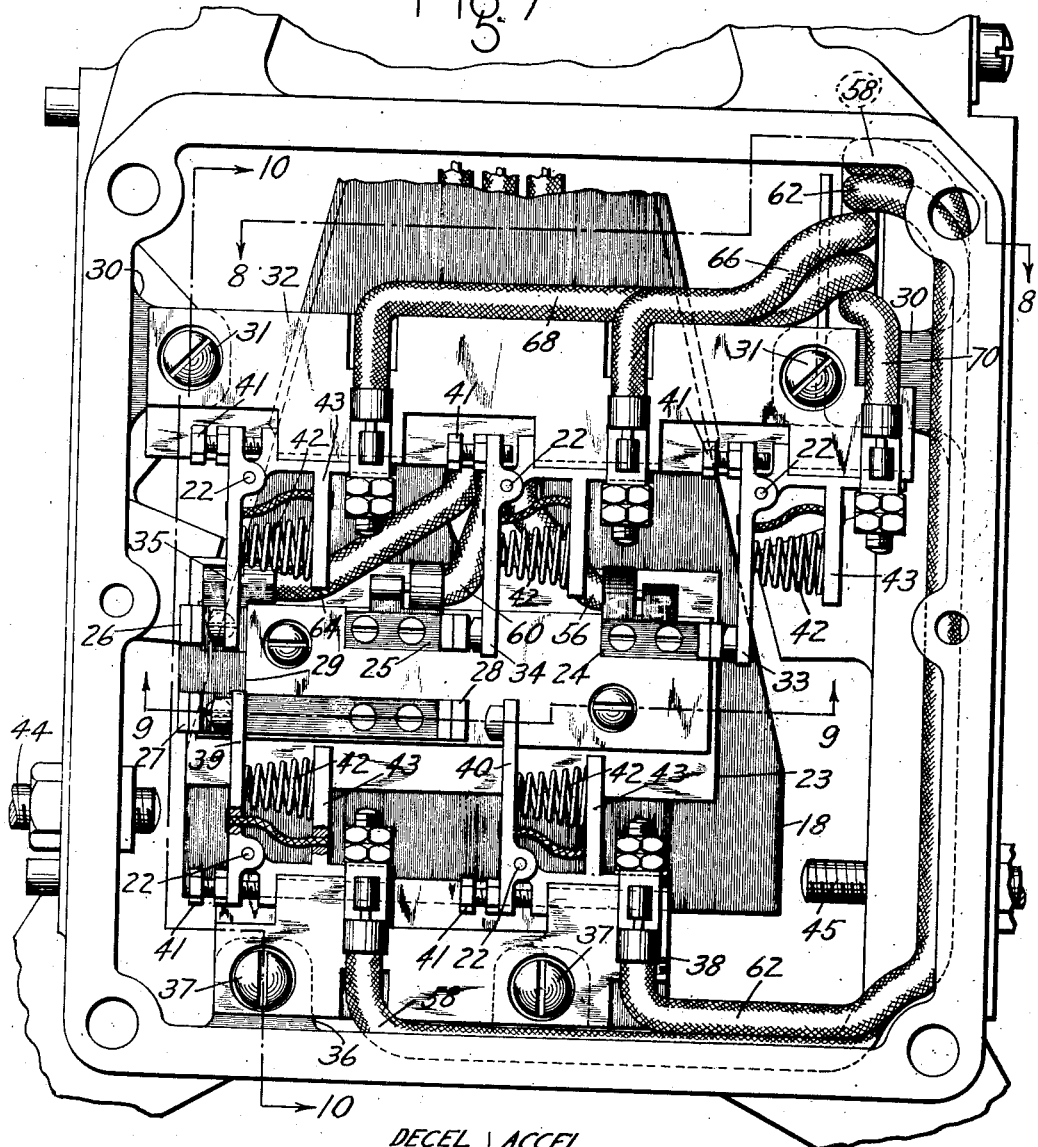

March 28, 1939.    E. E. HEWITT    2,152,256
INERTIA DEVICE
Filed Jan. 6, 1937    4 Sheets-Sheet 4

INVENTOR
ELLIS E. HEWITT.
BY Wm. W. Cady
ATTORNEY

Patented Mar. 28, 1939

2,152,256

UNITED STATES PATENT OFFICE 2,152,256

INERTIA DEVICE

Ellis E. Hewitt, Edgewood, Pa., assignor to The Westinghouse Air Brake Company, Wilmerding, Pa., a corporation of Pennsylvania Application January 6, 1937, Serial No. 119,238

12 Claims. (Cl. 200—52)

This invention relates to inertia devices, and more particularly to inertia devices for controlling the acceleration and deceleration of railway and traction vehicles.

When attempting to maintain fast schedules on either railway or traction systems, it is important that the acceleration and deceleration of trains or vehicles be accomplished at relatively high rates, which rates are preferably uniform and to a degree not quite sufficient to produce wheel sliding during deceleration or wheel spinning during acceleration. It has heretofore been proposed to employ a device for this purpose which operates upon the principle of inertia, that is, the device comprises a body which is so mounted as to be responsive to the rate of acceleration or the rate of deceleration, with suitable control means being provided and actuated by said body. In the design of such devices it is important that they be both accurate and stable.

A principal object of the present invention is to provide an improved form of inertia device, which is adapted to control either acceleration or deceleration of a vehicle, or both, and which is so constructed as to be both accurate and stable.

A further object of the invention is to provide an inertia device of the electric type, that is, a device which operates one set of contacts during deceleration of the vehicle, for the purpose of controlling the brakes, and which operates a different set of contacts during acceleration, for the purpose of controlling the propelling means of the vehicle, with calibrated springs opposing the movement of said body and being so arranged as to provide both accuracy and stability in the operation of the contacts.

A yet more specific object of my invention is to provide an inertia device comprising a pendulum which is movable under a force during deceleration of a vehicle to sequentially operate a set of contacts, and which is similarly operated during acceleration to sequentially operate a different set of contacts, with springs so arranged as to sequentially oppose movement of said pendulum with relation to operation of said contacts.

Other objects and advantages of the invention, dealing particularly with specific constructions and arrangements of parts, will be more clearly understood from a description of an embodiment of the invention, which is illustrated in the attached drawings, wherein, Fig. 1 shows in schematic and diagrammatic form a preferred form of the invention.

Fig. 2 shows in perspective a fragmentary portion of the device illustrated in Fig. 1, relating to the spring arrangement which is operative during a deceleration operation of the device.

Figure 3:
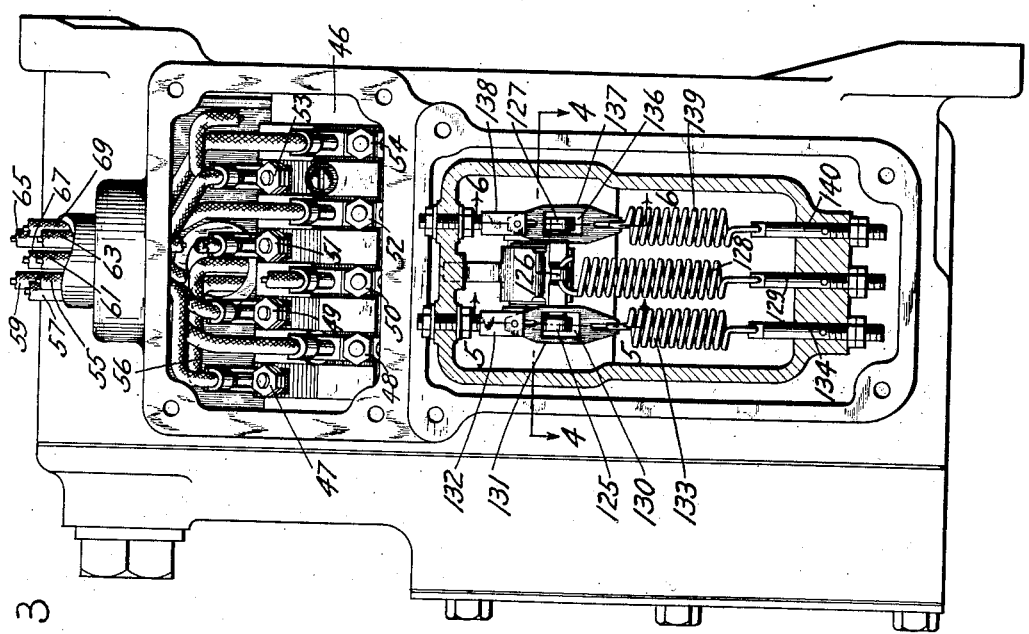
Fig. 3 is a view taken along the line 3—3 of Fig. 1.
Figures 5, 6:
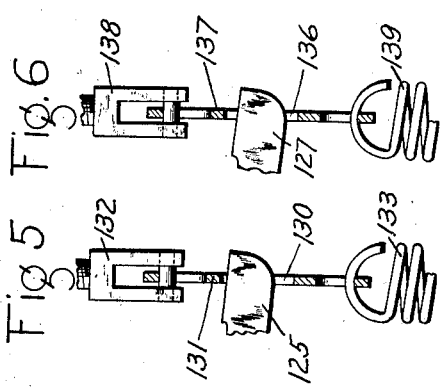
Figure 4:
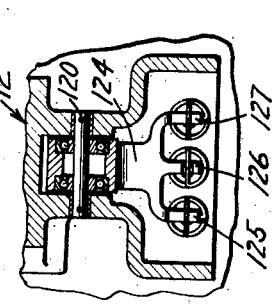

Figs. 4, 5 and 6 are fragmentary views taken, respectively along the lines 4—4, 5—5, and 6—6 of Fig. 3.

Fig. 7 is an enlarged view of a portion of the device shown in Fig. 1, illustrating the contact arrangement employed.

Figure 8:
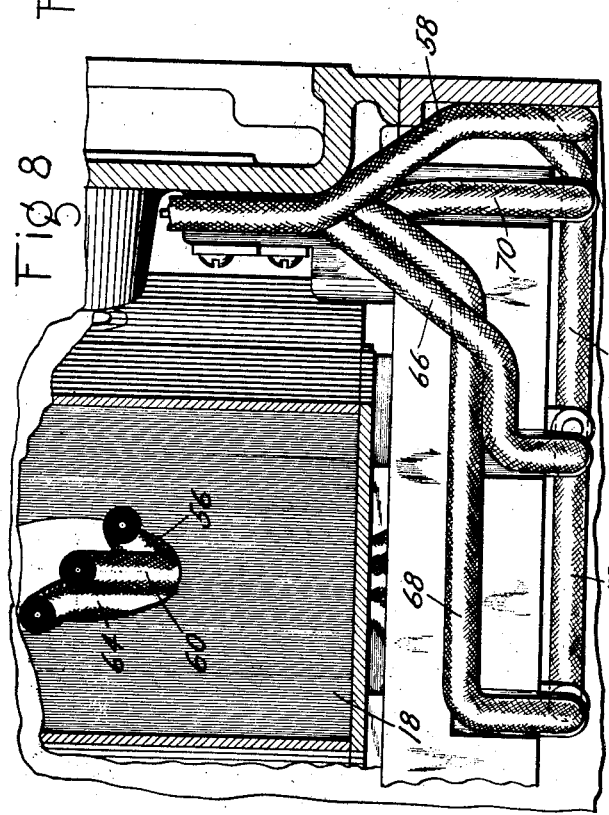
Figure 10:
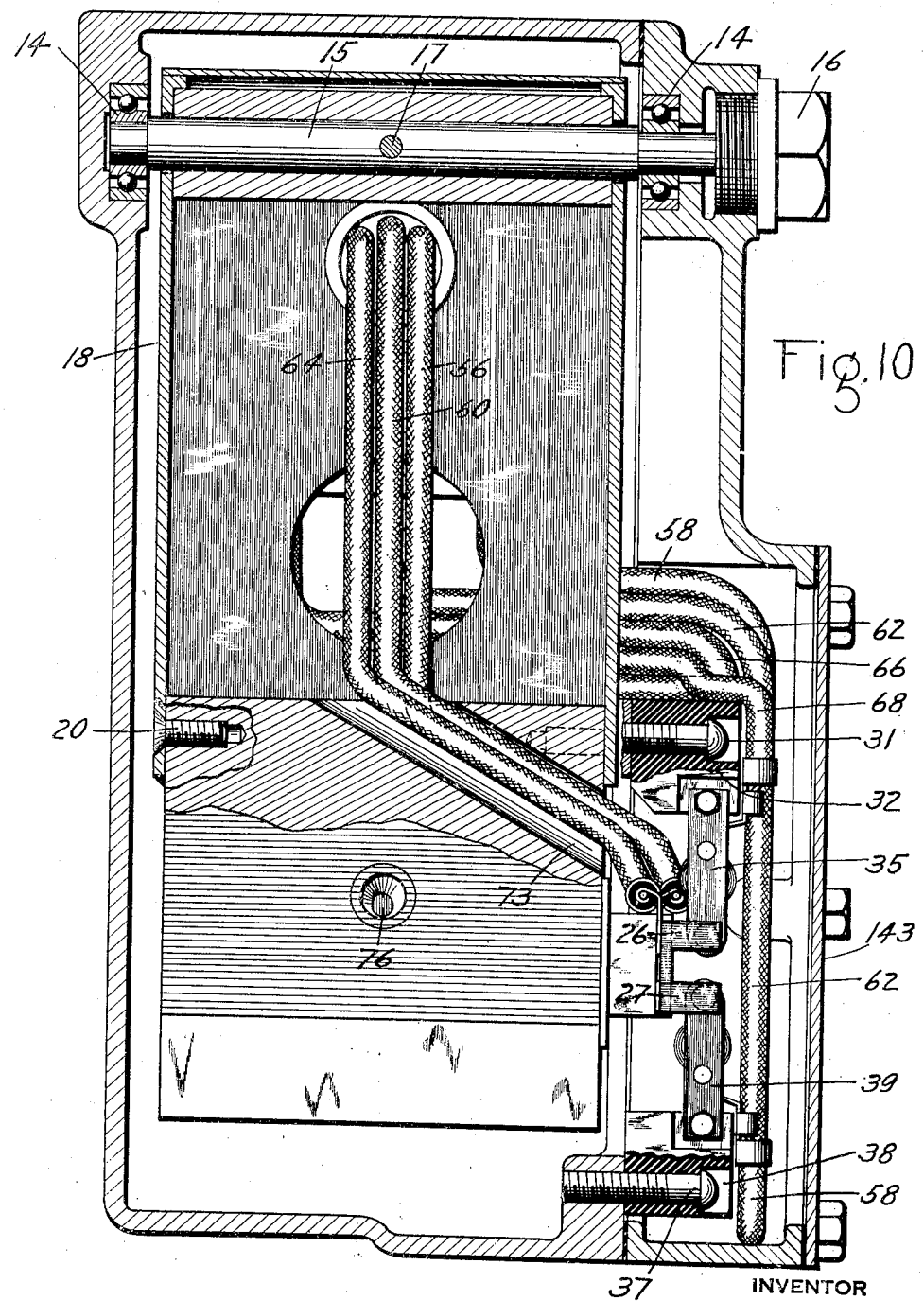

Figs. 8, 9 and 10 are views taken along the lines, respectively, 8—8, 9—9 and 10—10 of Fig. 7.

Referring now particularly to Fig. 1, the inertia device comprises three main sections, a pendulum section 10, a deceleration adjustment section 11, and an acceleration adjustment section 12.

Considering first the pendulum section 10, this section is embodied in a casing or housing 13 having suitably disposed therein on ball bearings 14 a shaft 15. A plug 16 is provided in one side of the casing 13, adjacent an end of the shaft 15, for the purpose of providing access to that end of the shaft.

Secured to the shaft 15 by a pin 17 is a pendulum device 18. This device comprises a relatively heavy body 19 having secured thereto by screws 20 a hollow casing 21. As shown, the hollow casing 21 is preferably comprised of formed sheet metal. The body 19 may be formed of cast iron, or other like material.

As best shown in Fig. 7, the pendulum device 18 has secured thereto an insulating plate 23. Suitably secured to the insulating plate 23 are five contacts, 24, 25, 26, 27 and 28. The contacts 24 and 25 are separate contacts, while the contacts 26, 27 and 28 are all mounted upon, or integral with, a common plate member 29.

Secured by screws 31 to lugs 30, which project inwardly of the pendulum section 10, is an insulating member 32. This member carries three contacts 33, 34 and 35. Also secured by screws 37 to different lugs 36, which project from the pendulum casing, is another insulating member 38. This member carries two contacts 39 and 40. As will be observed, the contacts 24 to 28, inclusive, are carried by and movable with the pendulum device 18, whereas the contacts 33 to 35, 39 and 40 are relatively stationary, and are carried by the casing of the pendulum section.

Each of the stationary contacts 33 to 35, 39 and 40, is rockable about a pivot 22, and is provided with an adjusting screw or bolt 41 for adjusting the degree to which the contact may rock about this pivot. A spring 42, positioned between each of the stationary contacts and an element 43, functions to urge the stationary contact in a contacting direction. Thus as each stationary contact is engaged by a movable contact on the pendulum the biasing spring 42 insures that a good contact will be made and maintained.

As is clearly shown in Fig. 7, the stationary contacts 33, 34, 35, 39 and 40 cooperate, respectively, with the movable contacts 24, 25, 26, 27 and 28. The group comprising contacts 24 and 33 and contacts 25 and 34 are provided for controlling the brakes of a vehicle during deceleration, while the group of contacts comprising 26 and 35, 27 and 39 and 28 and 40 are provided for controlling the propelling means during acceleration of the vehicle. When the inertia device is mounted on a railway or traction vehicle, it is intended that, during deceleration, the pendulum device 18 shall move to the left, as indicated by the arrow marked "Decel," and during acceleration shall move to the right, as similarly indicated by the opposing arrow marked "Accel".

The limit of movement of the pendulum device in one direction is determined by a limiting screw 44, and in the other direction by a limiting bolt 45.

As best shown in Figs. 1 and 3, secured in an upper part of the section 10 is a terminal board 46, which is provided with terminals 47 to 54 inclusive. The terminal 47 is provided with an outlet cable 55, and is connected by cable 56 to pendulum contact 24. The terminal 48 is provided with outlet cable 57, and is connected by cable 58 to stationary contact 39. Terminal 49 is provided with outlet cable 59, and is connected by cable 60 to pendulum contact 25.

Terminal 50 is provided with outlet cable 61, and is connected by cable 62 to stationary contact 40. Terminal 51 is provided with outlet cable 63, and is connected by cable 64 to pendulum contacts 26, 27 and 28. Terminal 52 is provided with outlet cable 65, and is connected by a cable 66 to stationary contact 34. Terminal 53 is provided with outlet cable 67, and is connected by cable 68 to stationary contact 35. Terminal 54 is provided with outlet cable 69, and is connected by a cable 70 to stationary contact 33.

It will be observed that cables 56, 60 and 64 pass through an insulating bushing 72 in the pendulum casing 21, and down through this casing and out an opening 73 to the contacts before mentioned. The movement of the pendulum is not appreciably affected by the presence of the cables.

Considering now the deceleration adjusting mechanism in the section 11, this mechanism comprises a pin 75, one end of which projects into a recess 76 in one side of the pendulum device 18, and the other end of which abuts against an adjusting screw 77 in one end of an arm 78, which in the position illustrated strikes a stop 108. The arm 78 is integral with a hub 79 having therein a ball bearing 80 disposed on a shaft 81 carried by the casing. Projecting from the hub 79 are two other arms 82 and 83. The end of the arm 82 connects through an adjustable stud 84 to one end of a spring 85. The other end of the spring 85 connects to the end of an arm 86, which arm is pivotally mounted intermediate its ends on a shaft 87, through a ball bearing 88.

The arm 83 projects into a rectangular opening 90 in a link member 91, one end of which is loosely secured to and movable with respect to a member 92, and the other end of which is connected to a spring 96. The member 92 is fastened to an adjustable stud 93 carried by a bracket 94 secured to the casing. The other end of the spring 85 fastens to a bracket 95 projecting from the casing.

As also shown in Fig. 2, the end of the arm 86 to which spring 85 is connected, is also connected to a second or biasing spring 97. The other end of the spring 97 is connected to one end of an adjustable stud 98 carried by a bracket 99 extending upwardly from the casing. As shown, several holes are provided in the arm 86 for connecting the spring 97 thereto.

The end of the arm 86 opposite to that connected to the two springs 85 and 97 is bifurcated to receive a cross-head member 100. Integral with and extending to one side of the cross-head member is a stem 101, which projects into a recess 102 on the rear side of a pison 103, which is disposed in a cylinder 104.

The cross-head 100 is also provided with a spring seat 105 on which rests one end of a biasing spring 106, the other end of the spring nesting in a spring housing 107.

The parts just described for the deceleration adjusting section 11 are preferably so arranged that as the pendulum device 18 moves to the left, as viewed in Fig. 1, the arm 78 is rocked in a counterclockwise direction. This in turn rocks the arms 82 and 83 through a similar angle. As the arm 82 rocks, its movement is continuously resisted by spring 85, and after a predetermined movement of the arm 78, the arm 83 engages the lower surface of the opening 90 in link 91, and thereafter further rotation of the arm 78 is opposed by both spring 85 and 96. As the arm 83 moves downwardly the link 91 moves relative to the member 92 because of the presence of the slot 110.

As the pendulum device 18 moves to the right towards its neutral position, the arm 83 will disengage from the link 91, while the spring 85 is still under tension. When the pendulum device has reached its neutral position, the minimum tension exists on the spring 85.

If now fluid under pressure is supplied to the cylinder 104, as by way of pipe 111, the piston 103 will move inwardly of the cylinder 104, and thus shift the cross-head member 100 to the right. This movement of the cross-head member is resisted by both biasing springs 106 and 97, so that a balance will be obtained when the opposing force offered by these two springs just balances the force due to the presence of the fluid pressure in the cylinder 104. When this balance is obtained an increased initial tension will have been placed on the spring 85. It follows, therefore, that a corresponding increase in force must be exerted on the pendulum device 18, over that required with the minimum initial tension on the spring 85, to expand the spring a given amount.

Considering now the acceleration adjusting mechanism contained in the section 12, this mechanism also comprises a rod or pin 114, one end of which projects into a recess 115 in the pendulum device, and the other end of which abuts against an adjusting screw 116 in the end of an arm 117. The arm 117 is integral with a hub 118, which carries a ball bearing 119 through which extends a shaft 120. The shaft 120 is carried by the casing enclosing the section 12. Extending upwardly from the hub 118 is an arm 121, which in the position illustrated abuts against a stop member 122, to define the extreme clockwise position of the arm 117.

As best shown in Figs. 1, 3 and 4, extending to one side of the hub 118 is an arm 124 provided with three prongs 125, 126 and 127. The prong 126 has secured thereto one end of a spring 128, the other end of the spring being attached to an adjustable stud 129. The prong 125 is disposed in a rectangular opening 130 of a link 131. The link 131 is secured at its upper end to an adjustable stud 132, and is slotted at its lower end. A spring 133 has one end connected to the slot in the link 131, and the other end connected to an adjustable stud 134.

The prong 127 projects into a rectangular opening 136 of a link member 137. The upper end of the link member 137 is connected to an adjustable stud 138, while the lower end of the link is slotted to receive one end of a spring 139. The lower end of the spring 139 is connected to an adjustable stud 140. It will be observed that the connection between each link and its stud and spring provides for relative movement therebetween.

When the pendulum device 18 moves to the right, the pin or rod 114 rocks the arm 117 in a counterclockwise direction. This causes a like rotation of the arm 124. The full movement of the arm 124 is opposed by the spring 128, and after the arm has moved through a short distance the prong 125 engages the uppermost edge of the opening 130 in link 131, and then the movement of the arm is opposed by both springs 128 and 133. When the arm 124 has moved through a further short distance, the prong 127 engages the upper edge of the opening 136 in link 137, and thereafter further movement of the arm 124 is opposed by the three springs 128, 133, and 139. As the pendulum device 18 moves towards its neutral position, the springs 139 and 133 will become ineffective in the order named.

The inertia device may be attached to a vehicle by means of lugs 142. In order that ready access may be had to the inertia device for inspection and adjustment of the contacts, a removable cover plate 143 is provided adjacent these contacts. Similarly, a removable cover plate 144 is provided adjacent the terminal board 46.

The operation of the illustrated embodiment of my invention is as follows:

It will be assumed that the inertia device is installed on a railway vehicle such that when the vehicle is decelerating the pendulum device 18 moves to the left, and when accelerated moves to the right, as viewed in Figs. 1 and 7. Of course, when the vehicle is at rest, or traveling at a constant rate of speed, the pendulum device will be in the position illustrated in Fig. 1, that is, in its neutral position. It is maintained there by virtue of the adjusting screws 77 and 116 being set up sufficiently so that the initial tension on springs 85 and 128 acts to restrain undesired movements of the pendulum. Its action is thus greatly stabilized.

Considering first the functioning of the device during acceleration, when the vehicle is accelerating the pendulum device 18 will be urged to the right under a force which is proportional to the rate of acceleration. The degree of movement of the pendulum 18 to the right is, therefore, a measure of the rate of acceleration at any given instant.

When the pendulum 18 has moved through a relatively short distance, corresponding to a low rate of acceleration, the pendulum contact 26 will engage the stationary contact 35. Just after this engagement takes place, the prong 125 on the arm 124 engages the upper end of the opening 130 in the link 131, so that, due to the added opposition of spring 133, there is a tendency to arrest further movement of the pendulum 18. However, if the rate of acceleration increases, the pendulum 18 will continue to move to the right, against opposition of both springs 128 and 133, and cause pendulum contact 27 to engage stationary contact 39. Immediately following the engagement of these contacts, the prong 127 engages the upper edge of the opening 136 in the link 137, and, due to the added opposition of spring 139, there is a tendency to resist further movement of the pendulum to the right.

However, if the rate of acceleration increases further, further movement of the pendulum 18 to the right, against opposition of all three springs, will cause pendulum contact 28 to engage stationary contact 40.

Now it is intended that contacts 35, 39 and 40 will be connected to suitable devices for controlling the propelling means, so that at the particular rates of acceleration which cause engagement of the pendulum contacts with the stationary contacts the desired control over the propelling means may be effected.

As an example, if the propelling means is an electric motor, or motors, it may be desirable when the pendulum contact 26 engages stationary contact 35, that the rate at which current is supplied to the propelling motor should be reduced, and when contact 27 engages contact 39, that the rate of supply of current to the motor should be arrested, and when contact 28 engages contact 40, the supply of current to the motor should be entirely cut off.

It will thus be seen that, due to the arrangement shown and described, a precise control may be exercised over the propelling means.

Considering now the functioning of the device during deceleration, when the vehicle is decelerating the pendulum 18 will swing to the left. When it has swung through a short distance, corresponding to a relatively low rate of deceleration, the spring 85 will have been expanded sufficiently for pendulum contact 24 to disengage from stationary contact 33. Immediately following this disengagement the arm 83 will engage the lower edge of the opening 90 in the link 91, and further movement of the pendulum 18 will be additionally opposed by the spring 98. If the rate of deceleration increases further, and if the movement of the pendulum is sufficient, pendulum contact 25 will disengage from stationary contact 34.

It is intended that the two stationary contacts 33 and 34 will be connected to suitable devices for controlling the degree of application of the brakes. For example, the contact 33 may be connected to a cut-off magnet valve device, so that when contact 24 disengages therefrom the cut-off magnet valve device will close off further supply of fluid under pressure to the brake cylinder. The contact 34 may be connected to a release magnet valve device, so that when contact 25 disengages from this contact the release magnet valve device will function to release fluid under pressure from the brake cylinder. It will, therefore, be apparent that the device will function at precise rates of retardation to perform cut-off and release functions in the brake equipment.

The initial tension on the spring 85, under the condition illustrated in Fig. 1, is made sufficient so that the disengagement of contact 24 from contact 33 takes place at one rate of retardation, and the disengagement of the contact 25 from contact 34 takes place at a higher rate of retardation. When it is desired that these contacts disengage at yet higher rates of retardation, respectively, as during an emergency application of the brakes, fluid under pressure is supplied to the cylinder 104 through the pipe 111. This causes the piston 103 to move inwardly of the cylinder and thus increase the initial tension on the spring 85. It follows, therefore, that a higher rate of retardation than before will be required to cause contact 24 to disengage the contact 33, and a still higher rate will be required to cause contact 25 to disengage contact 34.

It will thus be seen that I have provided an improved inertia device which will function during acceleration of a vehicle to sequentially operate contacts, intended to control the propelling means, and which will operate during deceleration of a vehicle to sequentially operate other contacts, to control the brakes of a vehicle, and that such a device will be both accurate and stable.

While I have illustrated my invention with particular reference to a specific embodiment thereof, it is not my intention to limit the invention to this precise embodiment, or otherwise than by the spirit and scope of the appended claims.

Having now described my invention, what I claim as new and desire to secure by Letters Patent, is:

1. In an inertia device, in combination, a body movable under a force of inertia, a rockable arm movable in accordance with the movement of said body, and a plurality of springs for sequentially opposing movement of said rockable arm.

2. In an inertia device, in combination, a body movable under a force of inertia, a rockable arm, a spring connected to said arm, and a member urged into contact with said body by said arm, said arm and member being movable as said body moves, against the opposition of said spring.

3. In an inertia device, in combination, a body movable under a force of inertia, a rockable member having a plurality of projecting arms, means for rocking said rockable member in accordance with movement of said body, a first spring connected to one of said arms for at all times opposing movement of said rockable member, and means including a second spring engageable with another of said arms for causing said second spring to oppose certain movements only of said body.

4. In an inertia device, in combination, a pendulum movable under a force of inertia, a rockable member having two projecting arms, means for causing said rockable member to move coextensive with movement of said pendulum, a first spring connected to one of said arms for opposing movement of said rockable member for all movements thereof, a second spring engageable with the other of said arms, and means so constructed and arranged as to cause said second spring to oppose movement of said rockable member only after it has moved through a predetermined distance.

5. In an inertia device, in combination, a body movable under a force of inertia, contacts carried by said body, stationary contacts adapted to be engaged by said first contacts, a rockable member, means for moving said rockable member in accordance with movements of said body, and a plurality of spring means for sequentially opposing movement of said rockable member with relation to engagement of said contacts.

6. In an inertia device, in combination, a body movable under a force of inertia, a plurality of contacts carried by said body, a plurality of stationary contacts adapted to be sequentially engaged by said first contacts, a rockable member movable coextensive with movement of said body, a plurality of springs for opposing movement of said rockable member, and means so constructed and arranged that the number of springs which oppose movement of said rockable member increases as said pendulum contacts sequentially engage said stationary contacts.

7. In an inertia device, in combination, a pendulum adapted to be moved under a force of inertia, a plurality of contacts carried by said pendulum, a plurality of stationary contacts so arranged that some are engaged by some of said pendulum contacts when the pendulum swings in one direction, and others are disengaged by other of said pendulum contacts as said pendulum swings in the opposite direction, a first rockable member movable with said pendulum as it swings in one direction, a second rockable member movable with said pendulum as it swings in the opposite direction, and spring means for opposing movement of each of said rockable members.

8. In an inertia device, in combination, a pendulum adapted to be moved under a force of inertia, two sets of contacts carried by said pendulum, a first set of stationary contacts adapted to be engaged by one of said set of pendulum contacts when said pendulum is in a neutral position, a second set of stationary contacts adapted to be disengaged from the other set of pendulum contacts when said pendulum is in the neutral position, said pendulum being movable in one direction to cause successive disengagement of said engaged contacts and movable in an opposite direction to cause sequential engagement of said disengaged contacts, a first rockable member for opposing movement of said pendulum in one direction, a second rockable member for opposing movement of said pendulum in the opposite direction, and spring means for opposing movement of each of said rockable members, and being so constructed and arranged that the number of springs opposing movement of each of said rockable members in either direction increases with increased movement of said members.

9. In an inertia device, in combination, a pendulum movable under a force of inertia, a rockable member having two projecting arms, means for moving said rockable member coextensive with movement of said pendulum, a first spring connected to one of said arms and being adapted to oppose movement of said rockable member at all times, a second spring, and lost motion means for engaging said second spring with said second arm for opposing movement of said rockable member for certain movements only.

10. In an inertia device, in combination, a body movable under a force of inertia, a rockable member having three projecting elements, means for moving said rockable member in accordance with movement of said body, a first spring attached to one of said elements and being adapted to oppose movement of said rockable member at all times, a second spring, means associated with a second one of said elements for causing said second spring to oppose movement of said rockable element only after moving through a predetermined distance, a third spring, and means associated with said third element for causing said third spring to oppose movement of said rockable element only after movement through a second predetermined distance.

11. In an inertia device, in combination, a body movable under a force of inertia, a rockable element, means for moving said rockable element in accordance with movement of said body, a plurality of springs, and means so constructed and arranged as to cause an increasing number of said springs to oppose movement of said rockable element as the distance through which said rockable element moves increases.

12. In an inertia device, in combination, a pendulum movable under a force of inertia, a first rockable element movable by said pendulum when it swings in one direction, a second rockable element movable by said pendulum as it swings in the opposite direction, two groups of springs, means so constructed and arranged that a first group of said springs opposes movement of one of said rockable members and a second group of said springs opposes movement of the other of said rockable members, the springs in each group being rendered effective successively and cumulatively as the associated rockable element moves through a predetermined distance.

ELLIS E. HEWITT.

DISCLAIMER 2,152,256.—*Ellis E. Hewitt*, Edgewood, Pa. INERTIA DEVICE. Patent dated March 28, 1939. Disclaimer filed October 11, 1939, by the patentee, the assignee *The Westinghouse Air Brake Company*, consenting.

Hereby enters this disclaimer to claims 1, 2, and 11 of said patent.

[*Official Gazette October 31, 1939.*]